(12) United States Patent
Pan et al.

(10) Patent No.: US 11,055,243 B1
(45) Date of Patent: Jul. 6, 2021

(54) HIERARCHICAL BANDWIDTH ALLOCATION BUS ARBITER

(71) Applicant: Nuvoton Technology Corporation, Hsinchu (TW)

(72) Inventors: Guanhong Pan, Newark, CA (US); Yaoching Liu, Cuptertino, CA (US)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 16/852,537

(22) Filed: Apr. 19, 2020

(51) Int. Cl.
*G06F 13/366* (2006.01)
*G06F 13/40* (2006.01)

(52) U.S. Cl.
CPC ........ *G06F 13/366* (2013.01); *G06F 13/4031* (2013.01); *G06F 2213/36* (2013.01)

(58) Field of Classification Search
CPC .................. G06F 13/366; G06F 13/4031
See application file for complete search history.

(56) References Cited

U.S. PATENT DOCUMENTS

| | | | | |
|---|---|---|---|---|
| 2004/0103231 A1* | 5/2004 | Zhu | ........... | G06F 13/364 710/113 |
| 2004/0163084 A1* | 8/2004 | Devadas | ........... | H04L 47/10 718/103 |
| 2005/0257012 A1* | 11/2005 | Hughes | ........... | G06F 13/1605 711/151 |
| 2006/0200607 A1* | 9/2006 | Subramaniam Ganasan | | G06F 13/362 710/113 |
| 2008/0147944 A1* | 6/2008 | Sonntag | ........... | G06F 13/362 710/240 |
| 2009/0077274 A1* | 3/2009 | Caruk | ........... | G06F 13/4278 710/29 |
| 2015/0009823 A1* | 1/2015 | Ganga | ........... | H04L 47/2441 370/235 |
| 2016/0147687 A1* | 5/2016 | Check | ........... | G06F 13/372 710/117 |
| 2016/0239446 A1* | 8/2016 | Su | ........... | H01L 23/49838 |
| 2017/0075838 A1* | 3/2017 | Nooney | ........... | H04L 49/1515 |

* cited by examiner

*Primary Examiner* — Tim T Vo
*Assistant Examiner* — Phong H Dang
(74) *Attorney, Agent, or Firm* — Kilpatrick Townsend & Stockton, LLP

(57) ABSTRACT

A method for bandwidth allocation includes receiving requests for bus channel access from two or more master devices. Next, the method selects one of priority-based allocation or credit-based allocation. Upon selecting the priority-based allocation, the method grants bus channel access based on pre-assigned priorities for bus channel access. Upon selecting credit-based allocation, the method grants bus channel access based on pre-allocated credits for bus channel access, and the method decrements the credit from the master device that has been granted bus channel access.

19 Claims, 5 Drawing Sheets

HIERARCHICAL BANDWIDTH ALLOCATION BUS ARBITER

BACKGROUND OF THE INVENTION

This application relates to computer systems. More specifically, some embodiments of the invention are directed to bus channel bandwidth allocation in a multiple-processor computer system.

As many blocks are integrated into one single chip in system on chip (SOC) design, a powerful on chip bus architecture is needed. The Advanced High Performance Bus (AHB) from ARM™ is widely used on a range of ASIC or SOC parts to handle multi-processor designs with larger numbers of controllers and peripherals. The problem arises when multiple master devices are trying to access one slave at the same time. Then an arbiter is needed to determine which master will have the grant to access the slave at this time. Many arbitration algorithms are currently used, such as round-robin priority, fixed priority-based, etc. However, these conventional methods are not satisfactory, as explained further below.

Therefore, there is a need for an improved bus channel bandwidth allocation method.

BRIEF SUMMARY OF THE INVENTION

The inventors have observed that conventional bus channel allocation methods have many drawbacks. For example, allocation base on round-robin priority does not provide efficient bandwidth utilization. On the other hand, fixed priority-based bandwidth allocation can result in starved master devices that have low priorities and do not get sufficient access to the bus channel. For example, in the round-robin algorithm, the priority of all master devices are placed in circular order, everytime the master device is located on the top of the circular buffer, it will get the grant, and then it will be moved to the end of the circular buffer. In this way, there can be a starvation-free system. But it cannot distinguish the relative importance of the requests, given that some requests can be more critical than others. In the fixed priority algorithm, the priority of all master devices are fixed, and the arbiter will grant bus access to the master having the highest priority among the master devices who send the request. In this way, the master with a lower priority can be starved.

In still another conventional allocation method, the weighted round robin arbitration, credits are assigned for each master device at the beginning, and after each transfer, the corresponding master device's credits is deducted by one. After a master device runs out of credits, the next master device is selected on a round-robin manner. All the credits of the master are reloaded after all masters run out of credits. The weighted round robin arbitration tends to be complex and does not offer efficient allocation. For example, a master device having a high credit can monopolize the bus for a long duration. Further, when a master device runs out of credits, it must wait for the next turn in the round robin, which can cause a degraded performance.

Embodiments of the present invention provide a device and method for a hierarchical bus channel bandwidth allocation. In some embodiments of the hierarchical bandwidth allocation, at a first level, it is determined that a first portion of time slices is allocated to a first allocation scheme and a second portion of time slices is allocated to a second allocation scheme. Merely as an example, in 20% of time slices, a priority-based allocation is used, and in 80% of time slices, credit-based allocation is used. Other allocation ratios can also be used depending on the application, for example, 40% for priority-based allocation and 60% for credit-based allocation, or 60% for priority-based allocation and 40% for credit-based allocation, etc. In other examples, more than two allocation schemes can be selected and used alternatively. For example, round robin allocation can also be one of the alternative schemes. Moreover, the percentage of time slices for each allocation can be determined at the first level, depending on the application. In some cases, the percentage allocation can be pre-set or determined empirically or based on performance simulation results. In some embodiments, a time slice can be one clock cycle. In other embodiments, a time slice can include multiple clock cycles. At a second level of the hierarchical bandwidth allocation, the selected allocation schemes, such as priority-based allocation or credit-based allocation, can be carried out. As described further below, hierarchical bandwidth allocation can provide higher bandwidth utilization and can provide each master device bus sufficient allocation to finish time-sensitive tasks, thereby avoiding or reducing starved master devices. In some embodiments, credit-based allocation and priority-based allocation can be used alternately.

According to some embodiments of the present invention, an electronic device includes two or more master devices, one or more slave devices, a bus channel, and a bus arbiter. The bus channel is coupled to the two or more master devices and the one or more slave devices. The bus channel is configured to transfer information between a master device and a slave device. In some embodiments, the bus arbiter is configured to grant bus channel access by assigning a first percentage of time slices for priority-based allocation and a second percentage of time slices for credit-based allocation, activating the priority check circuit for priority-based allocation, and activating the credit check circuit for credit-based allocation. The bus arbiter is configured to grant bus channel access to master devices requesting access. The bus arbiter includes a priority check circuit, a credit check circuit, and two or more bus credit counters. A priority check circuit is configured to assign priorities for bus channel access to the two or more master devices, and grant bus channel access to the master device having a highest priority. Each of the two or more bus credit counters is associated with a respective one of the two or more master devices. The credit check circuit is configured to allocate credits for bus channel access to the two or more master devices. The credit check circuit is configured to determine if master devices requesting bus channel access have enough credits to be granted. Upon determining that only one master device requesting bus channel access has sufficient credits, the bus arbiter grants bus channel access to the master device. Upon determining that more than one master device requesting bus channel access have sufficient credits, the bus arbiter grants bus channel access to the master device under fixed priority scheme. The credit check circuit is also configured to decrement a fixed number of credits from the master device that has been granted bus channel access.

According to some embodiments of the present invention, a method for bandwidth allocation includes assigning priorities for bus channel access to two or more master devices, and allocating credits for bus channel access to the two or more master devices. The method also includes receiving requests for bus channel access from the two or more master devices, and selecting one of priority-based allocation or credit-based allocation. Upon selecting the priority-based allocation, the method grants bus channel access to a master device having a highest priority. Upon selecting credit-based allocation, the method first determines if master devices requesting bus channel access have sufficient credits. Upon determining that only one master device requesting bus channel access has sufficient credit, the method grants bus channel access to the master device. Upon determining that more than one master device requesting bus channel access have sufficient credits, the method grants bus channel access to the master device having a highest priority. The method also includes decrementing credit from the master device that has been granted bus channel access. In some embodiments, the method selects one of priority-based allocation or credit-based allocation alternately.

According to some embodiments, a method for bandwidth allocation includes receiving requests for bus channel access from two or more master devices. Next, the method selects one of priority-based allocation or credit-based allocation. Upon selecting the priority-based allocation, the method grants bus channel access based on pre-assigned priorities for bus channel access. Upon selecting credit-based allocation, the method grants bus channel access based on pre-allocated credits for bus channel access, and the method decrements the credit from the master device that has been granted bus channel access.

For a more complete understanding of the disclosure, reference is made to the following detailed description and accompanying drawings.

BRIEF DESCRIPTION OF THE DRAWINGS

For a more complete understanding of the disclosure, reference is made to the following detailed description and accompanying drawings wherein.

DETAILED DESCRIPTION OF THE INVENTION

Figure 1:
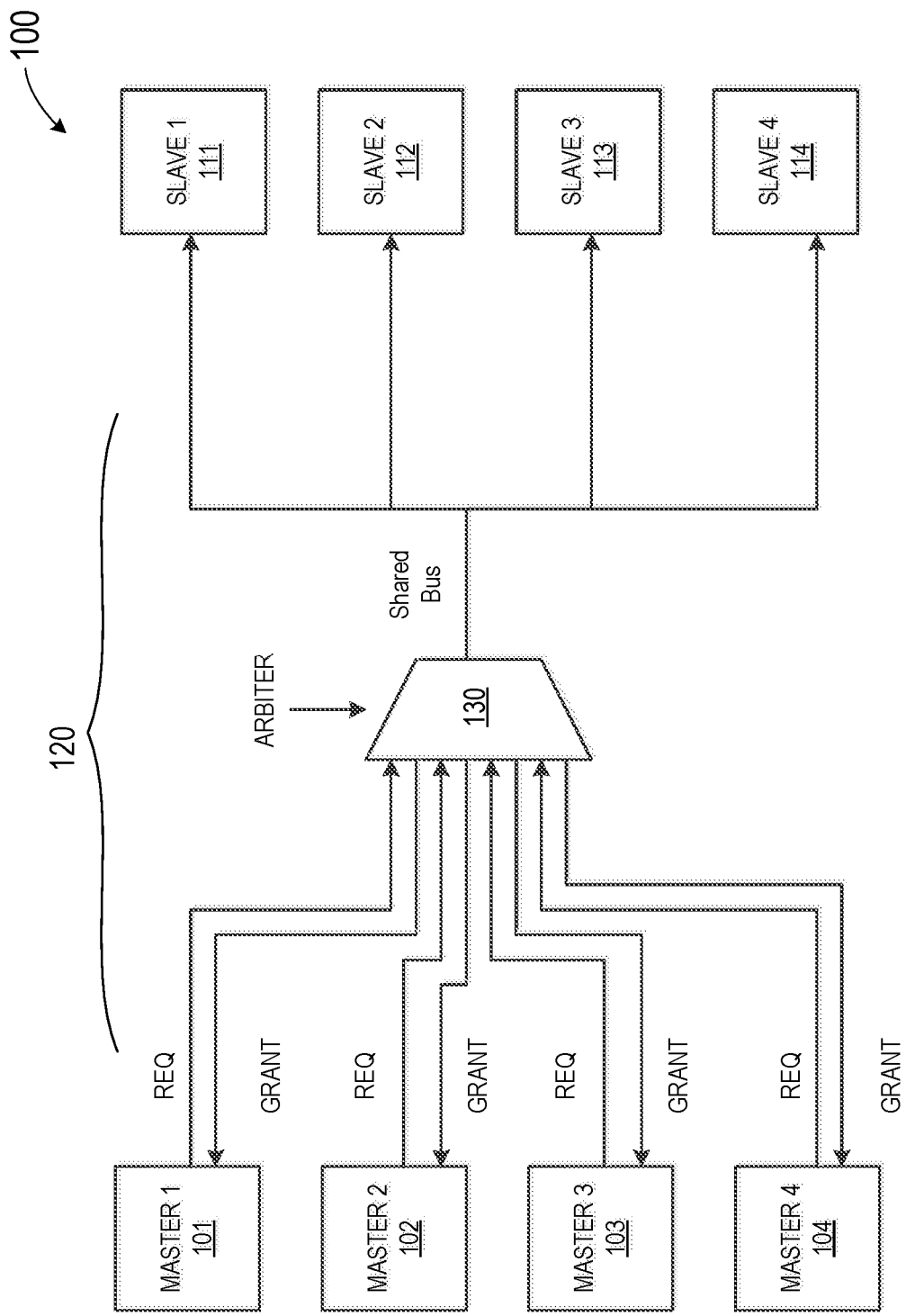
FIG. 1 is a simplified block diagram of an electronic device according to some embodiments of the present invention.

FIG. 1 is a simplified block diagram of an electronic device according to some embodiments of the present invention. In FIG. 1, electronic device 100 is an example of a multi-master and multi-slave system. In general, electronic device 100 can include two or more master devices and one or more slave devices. In the example of FIG. 1, electronic device 100 can include four master devices 101 (MASTER 1), 102 (MASTER 2), 103 (MASTER 3), and 104 (MASTER 4), and four slave devices 111 (SLAVE 1), 112 (SLAVE 2), 113 (SLAVE 3), and 114 (SLAVE 4). Electronic device 100 also has a bus channel 120 coupled to the two or more master devices and the one or more slave devices. Bus channel 120 is configured to transfer information between a master device and a slave device. Electronic device 100 can include a bus arbiter 130, configured to grant bus channel access to master devices requesting access. In some embodiments, bus arbiter 130 is configured to grant bus channel access using hierarchical bandwidth allocation. In the hierarchical bandwidth allocation, at a first level, it is determined that a first portion of time slices is allocated to a first allocation scheme and a second portion of time slices is allocated to a second allocation scheme. For example, bus arbiter 130 is configured to grant bus channel access by assigning a first percentage of time slices for priority-based allocation and a second percentage of time slices for credit-based allocation, activating the priority check circuit for priority-based allocation, and activating the credit check circuit for credit-based allocation. Merely as an example, in 20% of time slices, a priority-based allocation is used, and in 80% of time slices, credit-based allocation is used. In other example, more than two allocation schemes can be selected and used alternatively. For example, round robin allocation can also be one of the alternative schemes. Moreover, the percentage of time slices for each allocation can be determined at the first level, depending on the application. In some cases, the percentage allocation can be pre-set or determined empirically or based on performance simulation results. At a second level of the hierarchical bandwidth allocation, the selected allocation schemes, such as priority-based allocation or credit-based allocation, can be carried out, as described further below.

In some embodiments, the credits of the different master devices will be accumulated at different speed. Important master device can have a faster speed. Then, each master can occupy the bandwidth whenever the credits are accumulated enough, and there is no need to wait in the round robin manner. The performance of the bandwidth usage will be much better. Further, instead of having only the credit-based part, the hierarchical bandwidth allocation also has the shared usage portion. This hierarchical arrangement can make the system more dynamic. The credit accumulation speed can be determined by the bandwidth requirement, which can be measured by, for example, the MIPS (million instructions per second) needed of the master device. Merely as an example, a system may have a bus channel having a bandwidth of 20 MIPS. A first master device has a demand for 16 MIPS, and a second master device ma have a demand for 4 MIPS. In this case, the first master device may be allocated 16/20 or 0.8 credit units, and the second master device may be allocated 4/20 or 0.2 credit units. In some cases, the first master device may operate in a burst mode, which may utilize 19-20 MIPS bandwidth of the bus channel, and prevent other master devices from accessing the bus channel. In some corner cases, a smaller master device may require a high bandwidth at some time. In this case, the shared used part, for example, the fixed priority part, can be helpful in this situation.

As an example, electronic device 100 can be an integrated circuit system-on-chip (SOC) that can have multiple CPU cores. In this case, the master devices can be the CPU cores, and the slave devices can be peripheral devices. As another example, electronic device 100 can have master devices such as a general-purpose processor, a graphics coprocessor, a direct memory access (DMA) engine, and an encoding/decoding engine. The master devices can read from and write to representative slave devices such as memory and I/O circuit. The master devices described here are representative only, and electronic device 100 may include any number of master devices having varied functionality. Further, electronic device 100 may not be restricted to be a single integrated circuit. For example, the multiple master devices and slave devices can reside in different integrated circuits.

As an example, bus channel 120 can be an advanced high performance bus (AHB). AHB is a generation of Advanced Microcontroller Bus Architecture (AMBA) bus from ARM™, which is intended to address the requirements of high-performance synthesizable design. For a multi-master, multi-slave system, all master devices send request signal REQ to arbiter 130, and arbiter 130 can return bus access grant signal GRANT to the selected master device, indicating which master device has the grant for the shared bus and transfer to the slaves.

Figure 2:
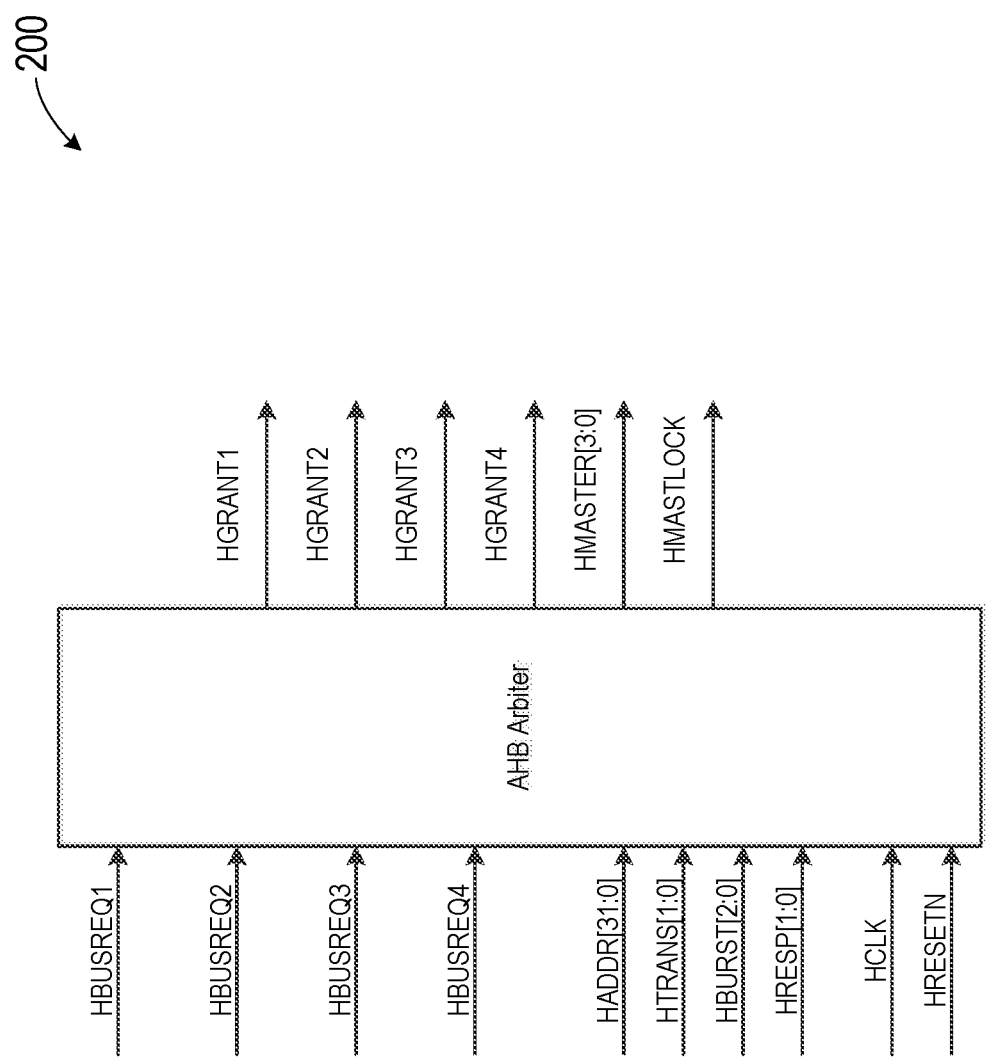
FIG. 2 is a simplified block diagram illustrating signal interface of an AHB arbiter.

FIG. 2 is a simplified block diagram illustrating signal interface of an AHB arbiter. The role of the arbiter 200 in an AMBA system is to control which master has access to the bus. Every bus master has a REQUEST/GRANT interface to the arbiter and the arbiter uses an arbitration algorithm to decide which bus master has the highest priority currently. FIG. 2 illustrates the signal interface of AHB arbiter 200. The signals include HBUSREQ1, HBUSREQ2, HBUSREQ3, HBUSREQ4, HADDR[31:0], HTRANS[1:0], HBURST[2:0], HRESP[1:0], HCLK, HRESETN, HGRANT1, HGRANT2, HGRANT3, HGRANT4, HMASTER[3:0], and HMASTLOCK.

The arbiter 200 in FIG. 2 is an example of arbiter, in which embodiments of the invention can be implemented. Different bus channel allocation algorithms can be implemented. However, conventional bus channel allocation algorithms have limitations, some of which are explained above. In embodiments of the invention, a bandwidth allocation arbiter is described, which can provide a higher bandwidth optimization and starvation-free system.

Figure 3:
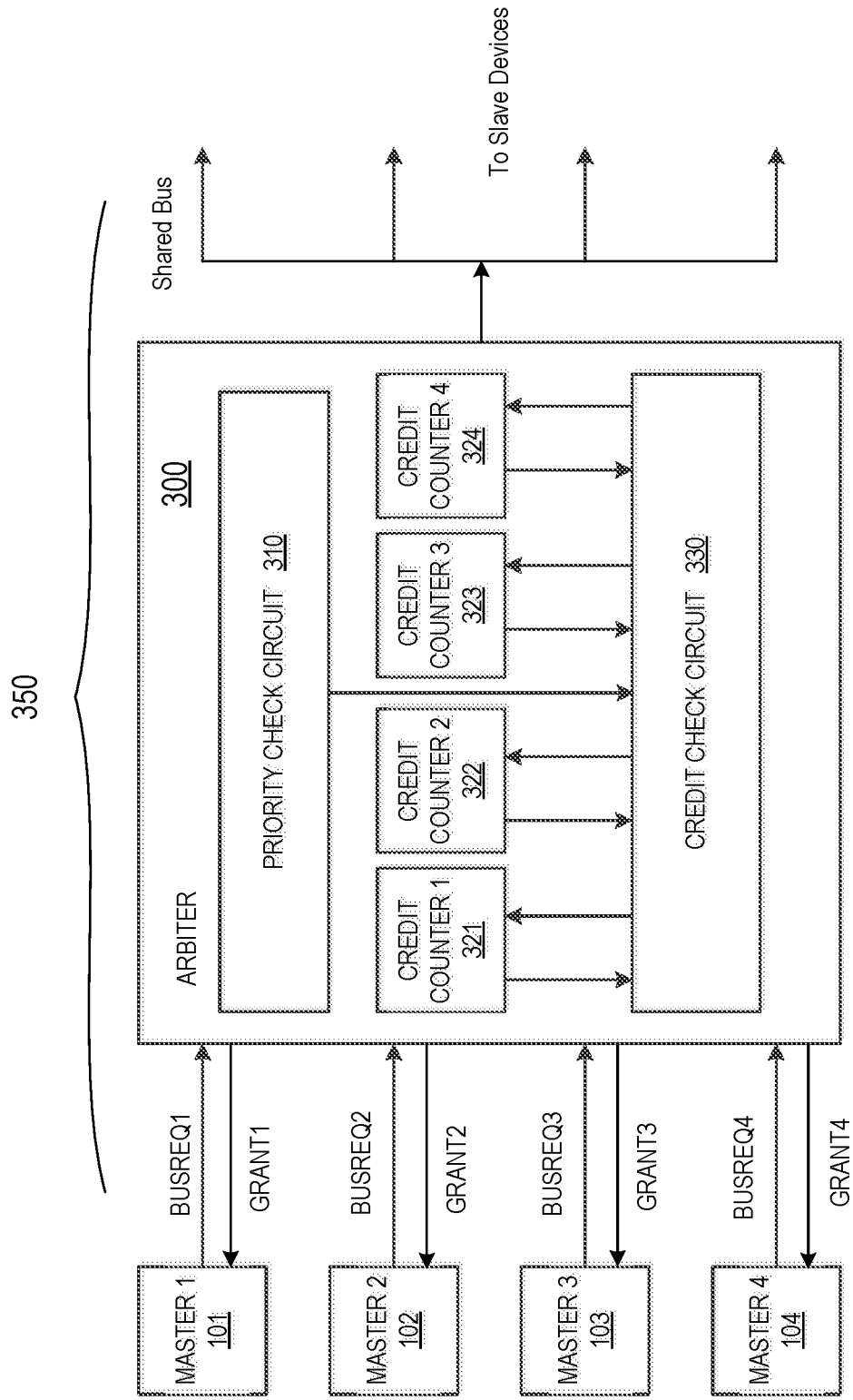
FIG. 3 is a simplified block diagram illustrating part of an electronic device that includes a bus arbiter according to some embodiments of the present invention.

FIG. 3 is a simplified block diagram illustrating part of an electronic device that includes a bus arbiter according to some embodiments of the present invention. As shown in FIG. 3, a bus arbiter 300 includes a priority check circuit 310, two or more bus credit counters 321 (CREDIT COUNTER 1), 322 (CREDIT COUNTER 2), 323 (CREDIT COUNTER 3), 324 (CREDIT COUNTER 4), and a credit check circuit 330. FIG. 3 also shows four master devices 101 (MASTER 1), 102 (MASTER 2), 103 (MASTER 3), and 104 (MASTER 4), similar to those in FIG. 1. FIG. 3 also shows a bus channel 350 that connects master devices 101-104 through bus arbiter 300 and a shared bus to slave devices (not shown). Master devices 101-104 send bus request signals, BUSREQ1, BUSREQ2, BUSREQ3, and BUSREQ4, respectively, to bus arbiter 300, and bus arbiter 300 returns bus grant signals, GRANT1, GRANT2, GRANT3, and GRANT4, to master devices 101-104, respectively.

In some embodiments, bus arbiter 300 is configured to grant bus channel access by assigning a first percentage of time slices for priority-based allocation and a second percentage of time slices for credit-based allocation, activating the priority check circuit for priority-based allocation, and activating the credit check circuit for credit-based allocation.

Priority check circuit 310 is configured to assign priorities for bus channel access to the two or more master device 101-104. Priority check circuit 310 grants bus channel access to the master device having a highest priority. For example, in the priority-based allocation, every master device is assigned a priority at the beginning. Then, the master device which has the highest priority will be granted bus channel access, and the other master device will be waiting.

Each one of the two or more credit counters 321, 322, 323, and 324 is associated with a respective one of the two or more master devices 101, 102, 103, and 104. Credit check circuit 330 is configured to allocate credits for bus channel access to the two or more master devices. The allocated credit for each master device can be stores in a credit counter associated with the corresponding master device. Credit check circuit 330 also determines if master devices requesting bus channel access have sufficient credits, and allocates bus channel access accordingly. For example, upon determining that only one master device requesting bus channel access has sufficient credit, credit check circuit 330 grants bus channel access to that master device. Further, upon determining that more than one master device requesting bus channel access have sufficient credits, credit check circuit 330 grants bus channel access to the master device having a highest priority or a highest credit count. Credit check circuit 330 also decrements credit from the master device that has been granted bus channel access. In this scenario, credits can be allocated and consumed.

For example, each credit counter can be set to be allocated credits differently. For example, each credit counter can be allocated different amount of credits at different time intervals. A first credit counter for a first master device can be allocated more frequently, e.g., once every time slice or less frequently than a second credit counter for another master device. Similarly, at allocation time, a first credit counter for a first master device can be allocated more credits than a second credit counter for another master device. When a master device sends out a request for bus channel access, credit check circuit 330 checks the corresponding credit counter to see if the master device has enough credit for the request. If the master device has enough credit, the request is granted, and a certain amount of credit is deducted or decremented. If more than one master devices are requesting bus channel access at the same time, and they both have enough credits, then bus arbiter 300 can activate priority check circuit 310 to grant bus channel access to the master device having a highest priority.

In some embodiments, the bandwidth of the bus channel is split into two parts, a credit-based part and a priority-based part. The percentage of each part can be programmed and changed on the fly. For example, the percentage can be programmed to be 20% and 80%. For example, in 20% of the time slices, a priority-based allocation of bus channel access can used. During the 80% of the time slices, a credit-based allocation is used.

In the priority-based allocation, whenever a master device requests bus channel access, it will get the grant if the bus channel is free. If more than one master device requests bus channel access at the same time, priority-based allocation will be used to decide which master can get the grant.

In the credit-based allocation, for example, each of the four master devices can have a credit counter. The maximum capacity of each credit counter can be the same, which means that the maximum credit of each master device is the same. Depending on the required bandwidth of each different master device, the speed of the credit consumption can be different, since the master device can need more data communication compared with others. So the credit of each master device can increment at different speed, but the maximum credit of each master is the same in this example. In one scenario, when a master device has received a maximum amount of credit, its credit cannot be incremented any more, unless it uses some of the credits.

In some embodiments, the maximum credits of the master devices and each master's credit accumulation speed can be programmed on the fly, too. The default credit of each master are set to the maximum credit, which means every master have enough credit for transactions at the beginning. For instance, the maximum credit of each master device can be set to 3. The first master device needs two clock cycles to get one credit, the second master needs four clock cycles to get one credit, the third master needs eight clock cycles to get one credit, the fourth master needs sixteen clock cycles to get one credit. When a master device wants access of the bus channel, the first step of the arbiter is to check if this master device has enough credit for the request. If the master device does have enough credit, then the request is granted. In an example, based on the bandwidth needed for this transaction, the credit needed for this transaction is decided. If the transaction needs a large bandwidth, then more than one credit may be needed.

After the request has been granted, the total credit of this master device is decremented. The decremented value can be based on the bandwidth it needed. In some embodiments, if the master device at this time at least has at least one credit, but not enough for the transaction. If there is no other qualified master device which is also requesting for the bus at the same time, the arbiter can grant bus channel access to this master device. However, the credit of this master device can now be negative (equal to current credit minus needed credit). Subsequently, the master device will need to payback for the borrowed credit. This can increase the bandwidth utilization to avoid long idle state of the bus.

In another example, if more than one master device is requesting bus channel access at the same time, and they have enough credits, the grant of bus channel access can be based on priority. In the priority-based allocation, every master device is assigned a priority at the beginning. Then, the master device which has the highest priority will be granted bus channel access, and the other master device will be waiting.

Figure 4:
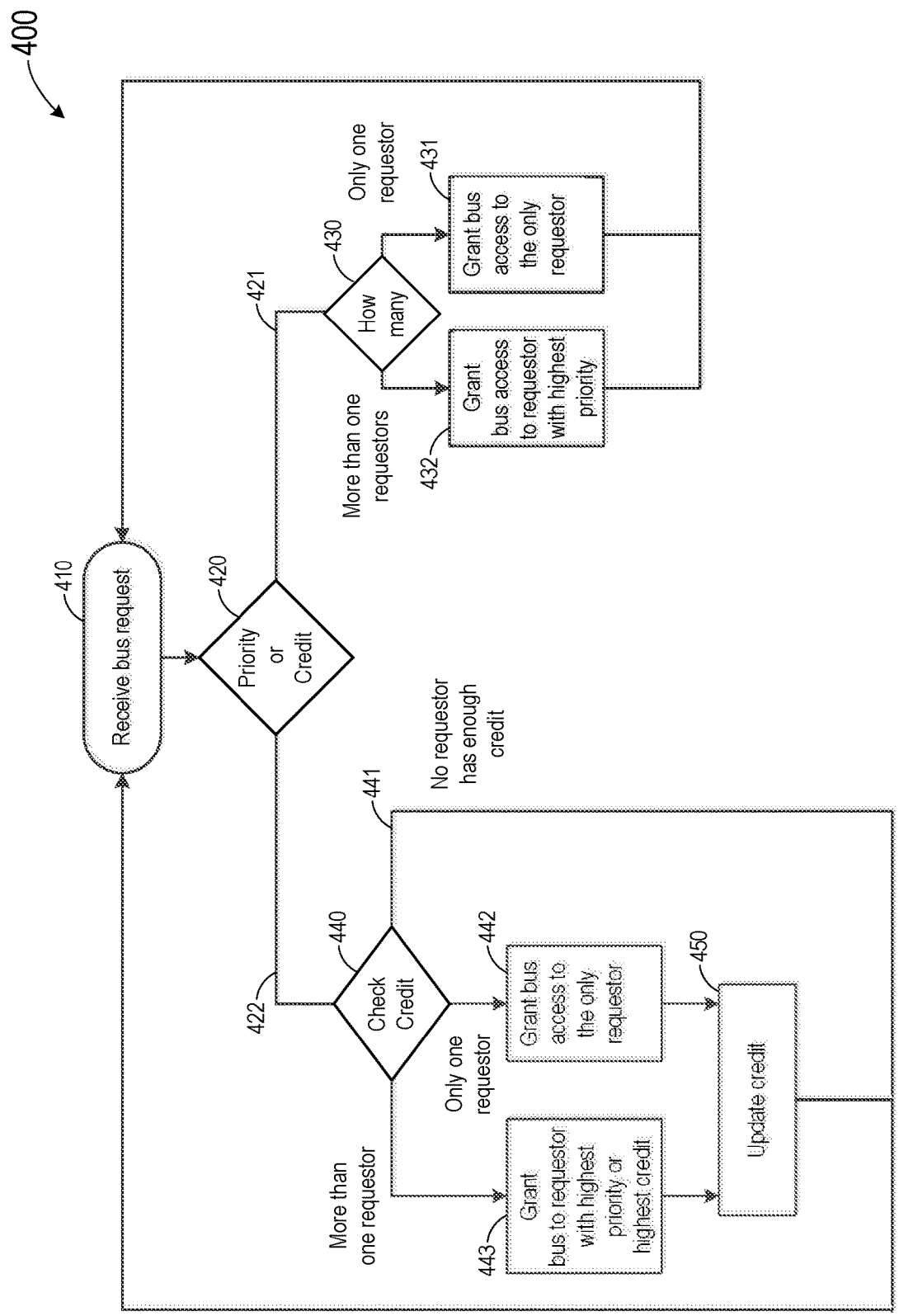
FIG. 4 is a simplified flowchart illustrating a method for bandwidth allocation according to some embodiments of the present invention.

FIG. 4 is a simplified flowchart illustrating a method for bandwidth allocation according to some embodiments of the present invention. The method described above can be summarized in FIG. 4 and further explained below. The method 400 can include assigning priorities for bus channel access to two or more master devices and allocating credits for bus channel access to the two or more master devices. At 410, the method includes receiving requests for bus channel access from two or more master devices. At 420, the method selects one of priority-based allocation or credit-based allocation. Here, the method can also include assigning a first percentage of time slices for priority-based allocation and a second percentage of time slices for credit-based allocation.

At 421, upon selecting the priority-based allocation, the method grants bus channel access based on the priority associated with the requesting master devices. At 422, upon selecting credit-based allocation, the method grants bus channel access based on the credit associated with the requesting master devices.

To illustrate more details about priority-based allocation, at 430, the method checks how many master devices are requesting access to the bus channel. At 431, if only one master device is requesting bus channel access, that master device is granted access. At 432, if more than one master device is requesting bus channel access, the master device having the highest priority is granted bus channel access.

Upon selecting credit-based allocation, at 440, the method determines if the master devices requesting bus channel access have sufficient credits. At 441, upon determining that no master device requesting bus channel access has sufficient credit, the method returns to 410, where the pending requests in the queue are considered. The request may be granted access when the priority-based allocation is active. At 442, upon determining that only one master device requesting bus channel access has sufficient credit, the method grants bus channel access to the master device. At 443, upon determining that more than one master device requesting bus channel access have sufficient credits, the method grants bus channel access to the master device having a highest priority or a highest credit.

At 450, the credit is decremented in the master device receiving bus channel access from either step 442 or step 443. Next, the method loops back to 410 to service the queue of bus channel access.

In some embodiments, the method selects priority-based allocation in 20% of time slices and selects credit-based allocation alternately in 80% of time slices.

In some embodiments, the method allocates credits for bus channel access to the master devices periodically. In an embodiment, the method allocates credits for bus channel access to the master devices once every time slice. In an embodiment, the method allocates credits for bus channel access to the master devices based on bus channel requirements of the master devices. In some embodiments, the method assigns priorities for bus channel access dynamically.

Figure 5:
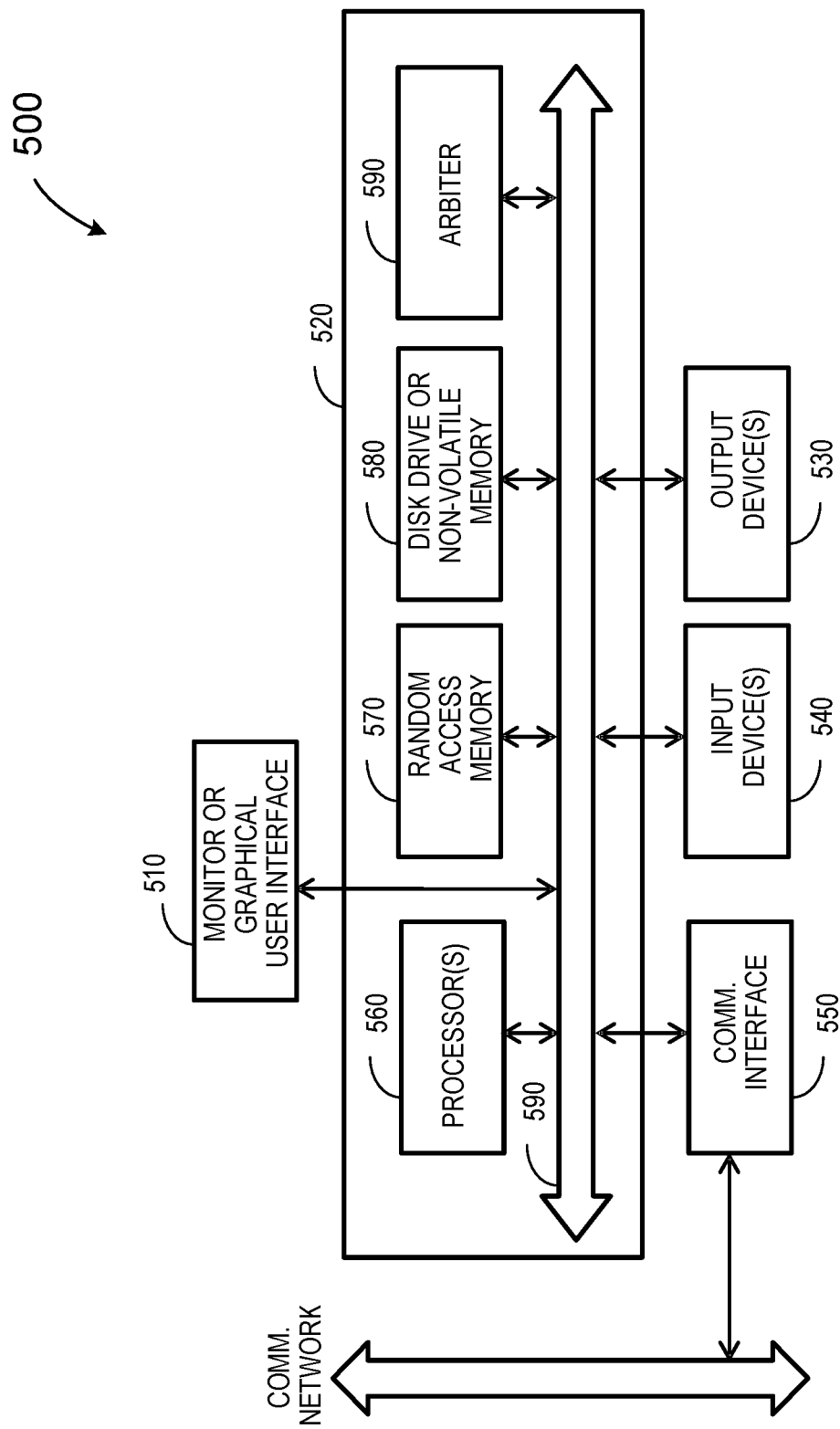
FIG. 5 is a simplified block diagram illustrating an apparatus that may be used to implement various embodiments according the present invention.

FIG. 5 is a simplified block diagram illustrating an apparatus that may be used to implement various embodiments according to the present invention. FIG. 5 is merely illustrative of an embodiment incorporating the present disclosure and does not limit the scope of the disclosure as recited in the claims. One of ordinary skill in the art would recognize other variations, modifications, and alternatives. In one embodiment, computer system 500 typically includes a monitor 510, a computer 520, user output devices 530, user input devices 540, communications interface 550, and the like.

As shown in FIG. 5, computer 520 may include a processor(s) 560 that communicates with a number of peripheral devices via a bus subsystem 590. These peripheral devices may include user output devices 530, user input devices 540, communications interface 550, and a storage subsystem, such as random access memory (RAM) 570 and disk drive 580. Computer 520 can also include an arbiter 590.

FIG. 5 is representative of a computer system capable of embodying the present disclosure. For example, electronic device 100 in FIG. 1 can be implemented using a system similar to system 500 depicted in FIG. 5. For example, processor(s) 560 in FIG. 5 can represent the multiple master devices in FIG. 1. As a specific example, processor(s) 560 can represent the multiple cores in an SOC. Further, the peripheral devices 530, 540, and 550, etc., can represent some of the slave devices depicted in FIG. 1. The functions of the arbiter in FIG. 1 can be carried out by arbiter 590 depicted in FIG. 5. Alternatively, the functions of the arbiter in FIG. 1 can be carried out by one of the processors 560 depicted in FIG. 5. For example, part of system 500 can represent a digital signal processor that can be used to implement the arbiter function. Alternatively, software codes executed in a general purpose processor, such as described in system 500, can be used to implement the arbiter function.

User input devices 540 can include all possible types of devices and mechanisms for inputting information to computer system 520. These may include a keyboard, a keypad, a touch screen incorporated into the display, audio input devices such as voice recognition systems, microphones, and other types of input devices. In various embodiments, user input devices 540 are typically embodied as a computer mouse, a trackball, a track pad, a joystick, wireless remote, drawing tablet, voice command system, eye tracking system, and the like. User input devices 540 typically allow a user to select objects, icons, text and the like that appear on the monitor 510 via a command such as a click of a button or the like.

User output devices 530 include all possible types of devices and mechanisms for outputting information from computer 520. These may include a display (e.g., monitor 510), non-visual displays such as audio output devices, etc.

Communications interface 550 provides an interface to other communication networks and devices. Communications interface 550 may serve as an interface for receiving data from and transmitting data to other systems. Embodiments of communications interface 550 typically include an Ethernet card, a modem (telephone, satellite, cable, ISDN), (asynchronous) digital subscriber line (DSL) unit, FireWire interface, USB interface, and the like. For example, communications interface 550 may be coupled to a computer network, to a FireWire bus, or the like. In other embodiments, communications interfaces 550 may be physically integrated on the motherboard of computer 520, and may be a software program, such as soft DSL, or the like.

In various embodiments, computer system 500 may also include software that enables communications over a network such as the HTTP, TCP/IP, RTP/RTSP protocols, and the like. In alternative embodiments of the present disclosure, other communications software and transfer protocols may also be used, for example IPX, UDP or the like. In some embodiments, computer 520 includes one or more Xeon microprocessors from Intel as processor(s) 560. Further, in one embodiment, computer 520 includes a UNIX-based operating system. Processor(s) 560 can also include special-purpose processors such as digital signal processor (DSP), reduced instruction set computer (RISC), etc.

RAM 570 and disk drive 580 are examples of tangible storage media configured to store data such as embodiments of the present disclosure, including executable computer code, human readable code, or the like. Other types of tangible storage media include floppy disks, removable hard disks, optical storage media such as CD-ROMS, DVDs and bar codes, semiconductor memories such as flash memories, read-only memories (ROMS), battery-backed volatile memories, networked storage devices, and the like. RAM 570 and disk drive 580 may be configured to store the basic programming and data constructs that provide the functionality of the present disclosure.

Software code modules and instructions that provide the functionality of the present disclosure may be stored in RAM 570 and disk drive 580. These software modules may be executed by processor(s) 560. RAM 570 and disk drive 580 may also provide a repository for storing data used in accordance with the present disclosure.

RAM 570 and disk drive 580 may include a number of memories including a main random access memory (RAM) for storage of instructions and data during program execution and a read-only memory (ROM) in which fixed non-transitory instructions are stored. RAM 570 and disk drive 580 may include a file storage subsystem providing persistent (non-volatile) storage for program and data files. RAM 570 and disk drive 580 may also include removable storage systems, such as removable flash memory.

Bus subsystem 590 provides a mechanism for letting the various components and subsystems of computer 520 communicate with each other as intended. Although bus subsystem 590 is shown schematically as a single bus, alternative embodiments of the bus subsystem may utilize multiple busses.

FIG. 5 is representative of a computer system capable of embodying the present disclosure. It will be readily apparent to one of ordinary skill in the art that many other hardware and software configurations are suitable for use with the present disclosure. For example, the computer may be a desktop, portable, rack-mounted or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc.; ARM™ microprocessors; and the like. Further, other types of operating systems are contemplated, such as Windows®, WindowsXP®, WindowsNT®, or the like from Microsoft Corporation, Solaris from Sun Microsystems, LINUX, UNIX, IOS from Apple Computer, Chrome from Google, and the like. In still other embodiments, the techniques described above may be implemented upon a chip or an auxiliary processing board.

Various embodiments of the present disclosure can be implemented in the form of logic in software or hardware or a combination of both. The logic may be stored in a computer-readable or machine-readable non-transitory storage medium as a set of instructions adapted to direct a processor of a computer system to perform a set of steps disclosed in embodiments of the present disclosure. The logic may form part of a computer program product adapted to direct an information-processing device to perform a set of steps disclosed in embodiments of the present disclosure. Based on the disclosure and teachings provided herein, a person of ordinary skill in the art will appreciate other ways and/or methods to implement the present disclosure.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

Certain embodiments have been described. However, various modifications to these embodiments are possible, and the principles presented herein may be applied to other embodiments as well. In addition, the various components and/or method steps/blocks may be implemented in arrangements other than those specifically disclosed without departing from the scope of the claims. Other embodiments and modifications will occur readily to those of ordinary skill in the art in view of these teachings. Therefore, the following claims are intended to cover all such embodiments and modifications when viewed in conjunction with the above specification and accompanying drawings.

What is claimed is:

1. An electronic device, comprising:
   two or more master devices;
   one or more slave devices;
   a bus channel coupled to the two or more master devices and the one or more slave devices, the bus channel configured to transfer information between a master device and a slave device; and
   a bus arbiter configured to grant bus channel access to master devices requesting access, the bus arbiter configured to assign a first percentage of time slices for priority-based allocation and a second percentage of time slices for credit-based allocation, wherein the bus arbiter includes:
   a priority check circuit configured to:
   assign priorities for bus channel access to the two or more master device; and
   grant bus channel access to the master device having a highest priority;
   two or more bus credit counters, each one of the two or more credit counters being associated with a respective one of the two or more master devices; and
   a credit check circuit configured to:
   allocate credits for bus channel access to the two or more master devices;
   determine if master devices requesting bus channel access have sufficient credits;
   upon determining that only one master device requesting bus channel access has sufficient credit, grant bus channel access to the master device;
   upon determining that more than one master device requesting bus channel access have sufficient credits, grant bus channel access to the master device having a highest priority or a highest credit count; and
   decrement credit from the master device that has been granted bus channel access.

2. The electronic device of claim 1, wherein the bus arbiter is configured to grant bus channel access by:
   assigning a first percentage of time slices for priority-based allocation and a second percentage of time slices for credit-based allocation;
   activating the priority check circuit for priority-based allocation; and
   activating the credit check circuit for credit-based allocation.

3. The electronic device of claim 2, wherein the bus arbiter alternately performs priority-based allocation and credit-based allocation.

4. The electronic device of claim 1, wherein the bus arbiter performs priority-based allocation during 20% of time and performs credit-based allocation during 80% of time.

5. The electronic device of claim 1, wherein the bus arbiter allocates credits for bus channel access to the master devices periodically.

6. The electronic device of claim 1, wherein the bus arbiter allocates credits for bus channel access to the master devices once every time slice.

7. The electronic device of claim 1, wherein the bus arbiter allocates credits for bus channel access to the master devices based on bus channel requirements of the master devices.

8. A method for bandwidth allocation, comprising:
   assigning priorities for bus channel access to two or more master devices;
   allocating credits for bus channel access to the two or more master devices;
   receiving requests for bus channel access from the two or more master devices;
   selecting one of priority-based allocation or credit-based allocation;
   upon selecting the priority-based allocation,
   granting bus channel access to a master device having a highest priority; and
   upon selecting credit-based allocation,
   determining if master devices requesting bus channel access have sufficient credits;
   upon determining that only one master device requesting bus channel access has sufficient credit, granting bus channel access to the master device;
   upon determining that more than one master device requesting bus channel access have sufficient credits, granting bus channel access to the master device having a highest priority; and
   decrementing credit from the master device that has been granted bus channel access.

9. The method of claim 8, further comprising assigning a first percentage of time slices for priority-based allocation and a second percentage of time slices for credit-based allocation.

10. The method of claim 8, further comprising selecting priority-based allocation in 20% of time slices and selecting credit-based allocation alternately in 80% of time slices.

11. The method of claim 8, further comprising allocating credits for bus channel access to the master devices periodically.

12. The method of claim 8, further comprising allocating credits for bus channel access to the master devices once every time slice.

13. The method of claim 8, further comprising allocating credits for bus channel access to the master devices based on bus channel requirements of the master devices.

14. The method of claim 8, further comprising assigning priorities for bus channel access dynamically.

15. A method for bandwidth allocation, comprising:
   receiving requests for bus channel access from two or more master devices;
   assigning a first percentage of time slices for priority-based allocation and a second percentage of time slices for credit-based allocation;
   selecting one of priority-based allocation or credit-based allocation;
   upon selecting the priority-based allocation,
   granting bus channel access based on pre-assigned priorities for bus channel access; and
   upon selecting credit-based allocation,
   granting bus channel access based on pre-allocated credits for bus channel access; and
   decrementing the credit from the master device that has been granted bus channel access.

16. The method of claim 15, further comprising:
   assigning priorities for bus channel access to the two or more master devices; and
   allocating credits for bus channel access to the two or more master devices.

17. The method of claim 15, further comprising:
   upon selecting credit-based allocation,
   determining if master devices requesting bus channel access have sufficient credits;
   upon determining that only one master device requesting bus channel access has sufficient credit, granting bus channel access to the master device;

upon determining that more than one master device requesting bus channel access have sufficient credits, granting bus channel access to the master device having a highest priority.

18. The method of claim 15, further comprising allocating credits for bus channel access to the master devices periodically.

19. The method of claim 15, further comprising allocating credits for bus channel access to the master devices based on bus channel requirements of the master devices.

* * * * *